(12) United States Patent
Tsirkin

(10) Patent No.: US 8,737,262 B2
(45) Date of Patent: May 27, 2014

(54) ZERO COPY TRANSMISSION WITH RAW PACKETS

(75) Inventor: Michael S. Tsirkin, Yokneam (IL)

(73) Assignee: Red Hat Israel, Ltd., Raanana (IL)

( * ) Notice: Subject to any disclaimer, the term of this patent is extended or adjusted under 35 U.S.C. 154(b) by 1008 days.

(21) Appl. No.: 12/625,397

(22) Filed: Nov. 24, 2009

(65) Prior Publication Data

US 2011/0122884 A1    May 26, 2011

(51) Int. Cl.
| | |
|---|---|
| H04L 12/28 | (2006.01) |
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04W 4/00 | (2009.01) |

(52) U.S. Cl.
USPC ............ 370/254; 370/252; 370/328; 370/412

(58) Field of Classification Search
None
See application file for complete search history.

(56) References Cited

U.S. PATENT DOCUMENTS

| | | | |
|---|---|---|---|
| 5,666,365 A | | 9/1997 | Kostreski |
| 6,081,518 A | | 6/2000 | Bowman-Amuah |
| 6,272,550 B1 | | 8/2001 | Deng et al. |
| 6,304,911 B1 | | 10/2001 | Bruich et al. |
| 6,366,559 B1 | | 4/2002 | Krishnan et al. |
| 7,356,039 B1 | * | 4/2008 | DiMambro ................. 370/411 |
| 7,657,659 B1 | | 2/2010 | Lambeth et al. |
| 7,729,328 B2 | | 6/2010 | Thubert et al. |
| 8,060,644 B1 | * | 11/2011 | Michailidis et al. .......... 709/234 |
| 2005/0091383 A1 | | 4/2005 | Bender et al. |
| 2006/0034167 A1 | | 2/2006 | Grice et al. |
| 2006/0112136 A1 | * | 5/2006 | Shankar et al. ............... 707/102 |
| 2007/0014245 A1 | * | 1/2007 | Aloni et al. .................... 370/252 |
| 2007/0061492 A1 | | 3/2007 | van Riel |
| 2007/0147390 A1 | * | 6/2007 | Jung et al. ................. 370/395.52 |
| 2008/0065839 A1 | * | 3/2008 | Pope et al. .................... 711/152 |
| 2008/0120426 A1 | | 5/2008 | Balakrishnan et al. |
| 2009/0037941 A1 | | 2/2009 | Armstrong et al. |
| 2009/0119684 A1 | | 5/2009 | Mahalingam et al. |
| 2009/0276775 A1 | | 11/2009 | Brown et al. |
| 2011/0126195 A1 | | 5/2011 | Tsirkin |

OTHER PUBLICATIONS

Menon et al. "Optimizing Network Virtualization in Xen," Apr. 17, 2006, static.usenix.org/event/usenix/06/tech/menon/menon_html/paper.html.*

(Continued)

*Primary Examiner* — Faruk Hamza
*Assistant Examiner* — Diane Lo
(74) *Attorney, Agent, or Firm* — Lowenstein Sandler LLP

(57) ABSTRACT

A system for providing a zero copy transmission with raw packets includes an operating system that receives an application request pertaining to a data packet to be transmitted over a network, where the data packet has already gone through networking stack processing invoked by the application. The operating system queries a driver of a network device on whether the network device has a zero copy capability. Based on the query response of the driver, the operating system determines whether a zero copy transmission should be used for the data packet. If not, the operating system copies the data packet from the application memory to a kernel buffer, and notifies the driver about the data packet in the kernel buffer. If so, the operating system refrains from copying the data packet to the kernel buffer, and notifies the driver about the data packet in the application memory.

25 Claims, 9 Drawing Sheets

(56) References Cited

OTHER PUBLICATIONS

Brustoloni et al, "Copy Emulation in Checksummed, Multiple-Packet Communication," 1997, Proceedings of the INFOCOM '97, Sixteeth Annual Joint Conference of the IEEE Computer and Communications Societies.*

Unknown Author, White Paper, "Broadcom Ethernet Network Contorller Enhances Virtualization Functionality, Oct. 2009," www.broadcom.com/collateral/wp/Virtualization-WP100-R.pdf.

Unknown Author, Wild Packets, "Packets and Protocols," http://www.wildpackets.com/resouces/compendium/wireless_lan/wlan_packets/printable.

Russell, "virtio: Towards a De-Facto Standard for Virtual I/O Devices", Jul. 2008, ACM SIGOPS Operating Systems Review Research and developments in the Linux kernel vol. 42, Issue 5.

Chase et al., "End System Optimizations for High-Speed TCP," Apr. 2001, IEEE Communications Magazine, 0163-6804/01.

Santos et al. "Bridging the Gap between Software and Hardware Techniques for I/O Virtualization," 2008, Proceeding ATC'08 USENIX, pp. 29-42.

Kurmann et al., "Speculative Defragmentation—Leading Gigabit Ethernet to True Zero-Copy Communication," Mar. 2001, Journal of Cluster Computing pp. 7-18.

Wilmann et al., "Concurrent Network Access for Virtualization Machine Monitors." Feb 10, 2007, HPCA 2007, IEEE 13th International Symposium.

Red Hat Office Action for U.S. Appl. No. 12/625,452, mailed Jul. 26, 2012.

Red Hat Office Action for U.S. Appl. No. 12/625,452, mailed Mar. 27, 2013.

Unknown Author, Wild Packets, "Packets and Protocols," http://www.wildpackets.com/resouces/compendium/wireless_lan/wlan_packets/printable, May 2009.

* cited by examiner

ZERO COPY TRANSMISSION WITH RAW PACKETS

TECHNICAL FIELD

Embodiments of the present invention relate to kernels. Specifically, embodiments of the invention relate to a method and system for providing a zero copy transmission with raw packets.

BACKGROUND

In a network-based architecture, applications running on a client computer or a server computer initiate numerous requests to send data over a network to an intended destination. Each of these requests is associated with significant overhead involving multiple context switching (e.g., from user mode to kernel mode and back) and multiple copying of data (e.g., from application memory to a kernel buffer and between different kernel buffers). The above excessive data copying and context switching can be reduced using a mechanism known as "zero copy transmission." In Linux environment, for example, this mechanism allows an application to request transmission of data by issuing a mmap system call that asks the operating system for a kernel buffer. The operating system reserves the buffer and returns to the application, which uses the kernel buffer to store the data and then issues a system call. The system call invokes the networking stack engine and returns to the application. The networking stack engine splits the data into packets and attaches headers to the data packets. The data packets are then passed to the network device driver, and a packet destructor is called to notify the operating system that it can reuse the kernel buffer.

Zero copy transmission eliminates unnecessary data duplication, thus decreasing overhead and improving performance. However, zero copy transmission has several limitations that complicate its use by existing applications, operating systems and network devices. In particular, an application typically has to request a kernel buffer to store its data and then has to issue a system call that invokes the networking stack engine. This system call returns immediately, and the application is no longer allowed to change the buffer. If the application needs to send more data for transmission, the application has to request a new kernel buffer. This increases the number of system calls, negatively affecting system performance. In addition, the operating system cannot reuse the kernel buffer until networking stack processing is completed and the data packets are passed to the network device. Further, existing mechanisms apply a zero copy transmission to all data provided by the application, and do not allow a zero copy transmission of only some of the data packets or only some portions of a data packet. Moreover, existing zero copy transmission mechanisms can only work with network devices that support checksum calculations for current protocols. Hence, zero copy transmission cannot be used if a network device cannot calculate checksums or does not recognize the current protocol.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of a method and system for providing a zero copy transmission with raw packets are described herein. In one embodiment, an operating system of a computing system receives an application request pertaining to a data packet to be transmitted over a network. The data packet to be transmitted resides in application memory and has a partial or full header. The request pertaining to the data packet can be received as a result of a system call issued by the application.

In response to the application request, the operating system queries a driver of a network device of the computing system on whether the network device has a zero copy capability. Based on the query response of the driver, the operating system determines whether a zero copy transmission should be used for the data packet. If this determination is negative, the operating system copies the data packet from the application memory to a kernel buffer, and notifies the driver about the data packet residing in the kernel buffer. If the above determination is positive, the operating system notifies the driver about the data packet residing in the application memory. The driver then provides the data packet to the network device, which transmits it over the network.

Figure 1:
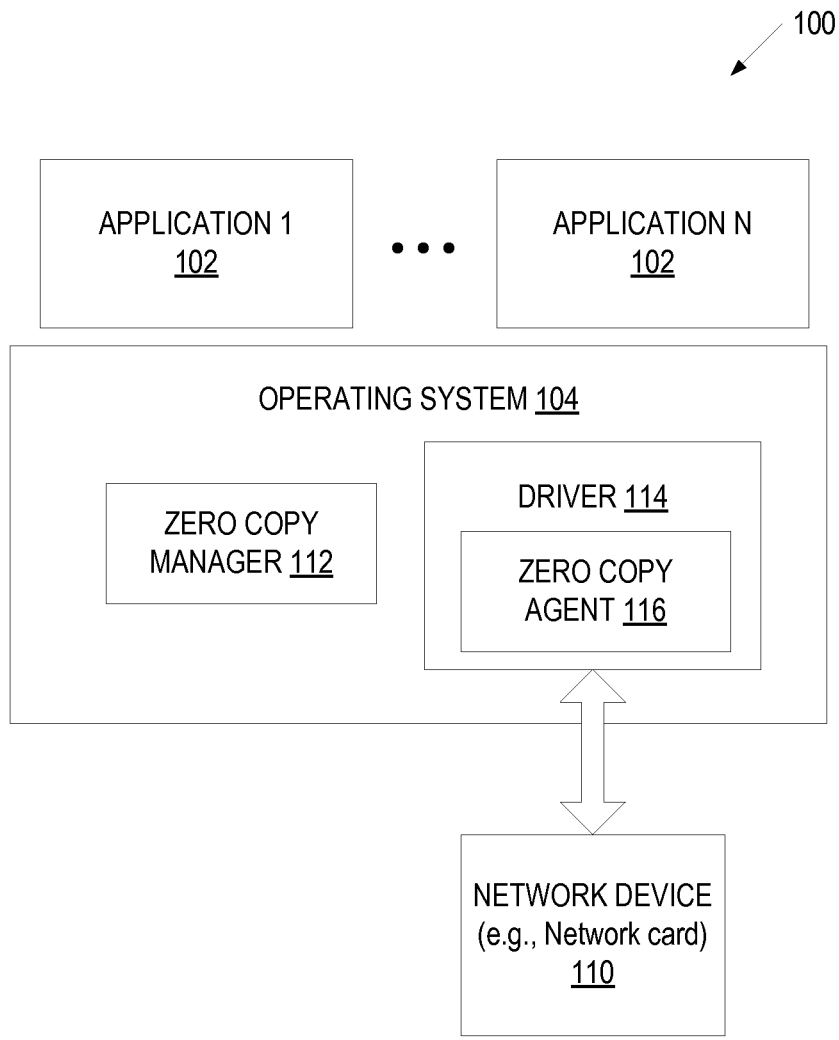
FIG. 1 is a block diagram of one embodiment of a zero copy transmission system.

FIG. 1 is a diagram of one embodiment of a zero copy transmission system 100 that may be part of a computing system such as a client computer (e.g., a personal computer, a laptop, a PDA, a mobile phone, etc.), a server computer, a gateway computer, etc. System 100 includes an operating system (e.g., Linux OS, Windows® OS, etc.), applications 102 running on top of the operating system 104, and a network device 110 that transmits data generated by the applications 102 over a network (e.g., a public network such as Internet or a private network such as LAN). The network device 110 may be a network card such as an Ethernet network card, a network interface controller (NIC), etc. The operating system 104 communicates with the network device 110 via a driver 114 that may be part of the operating system 104 or an independent component.

In one embodiment, the application 102 prepares data for transmission over a network and causes this data to go through networking stack processing. The networking stack processing may include packetizing the data and attaching at least a partial (e.g., at least a data checksum) header to each data packet. The networking stack processing may be invoked by, for example, the application 102 calling a system library including networking stack functionality, issuing a system call to provide networking stack functionality, or performing a designated submodule of the application 102. Once networking stack processing is completed, the operating system 104 is notified about the resulting data packet in the application memory. In one embodiment, the operating system 104 is notified as a result of a system call issued by the application 102 to request a kernel buffer for the data packet.

In one embodiment, the operating system 104 includes a zero copy manager 112 that determines whether the data packet should be transmitted using a zero copy transmission that avoids copying the data packet into the kernel buffer. The zero copy manager 112 makes this determination by first querying the driver 114 on whether the network device 110 has a zero copy capability. The network device 110 is considered to provide a zero copy capability if the network device 110 and the driver 114 can satisfy a set of conditions when instructed to perform a zero copy transmission. In one embodiment, the set of conditions includes a requirement for the network device 110 and/or the network device driver 114 to call a packet destructor within a small (predefined) time period after a data packet has been passed to the network device 110, and a requirement for the network device 110 and the network device driver 114 not to access data from the packet in the application memory after the packet destructor has been called. A packet destructor is a function that sends a signal to an entity (e.g., an application or an operating system) storing the packet data in memory, notify the entity that it can reuse the memory. In one embodiment, the set of conditions also includes a requirement for the network device 110 to support access to data in arbitrary locations in memory (e.g., a gather list including references to different memory locations for data of a packet).

In one embodiment, the driver 114 includes a zero copy agent that responds to the query of the zero copy manager 112. The driver 114 may include an indicator that specifies whether the network device 110 provides a zero copy capability. This indicator may be preprogrammed or set during system initialization. The zero copy agent 116 reads the value of the indicator and responds to the zero copy manger 112 accordingly.

If the network device 110 does not provide a zero copy capability, the zero copy manager 112 allocates a kernel buffer for the data packet, copies the data packet from the application memory to the kernel buffer, and notifies the driver 114 about the packet in the kernel buffer. After the zero copy manager 112 copies the data packet to the kernel buffer, it calls a packet destructor. The packet destructor signals to the application that it can reuse the application memory.

If the network device 110 provides a zero copy capability, the zero copy manager 112 does not copy the data packet to the kernel buffer, but rather notifies the driver 114 about the packet in the application memory. The driver 114 passes the data packet to the network device 110 and calls the packet destructor that signals to the application 102 that it can reuse the application memory. As will be discussed in more detail below, in one embodiment, when the zero copy manager 112 knows that the network device provides a zero copy capability, it performs an additional evaluation with respect to the data packet to determine whether a zero copy transmission is justified for the data packet. The additional evaluation may be based on characteristics of the data packet (e.g., the size of the packet, location of data fragments of the packet, content of the packet header, etc.) or other factors (e.g., whether portions of the packet require additional processing such as filtering, etc.). In an alternative embodiment, additional evaluation is performed by the zero copy agent 116 of the driver 114.

Embodiments of the present invention improve the zero copy technique by keeping the networking stack and the data source together (in the application), eliminating a copy of a data packet from application memory to a kernel buffer, and making this change transparent for the application while ensuring that the application does not reuse its buffer until the network device has queued the packet for transmission. In addition, embodiments of the present invention support both network devices that provide a zero copy capability and those that do not provide such a capability. Further, with embodiments of the present invention, a zero copy transmission can be applied only to some data packets and/or some portions of a data packet. Moreover, by facilitating data checksum calculations at the application level as opposed to the network device level, network devices that do not support transmission checksumming can still be used for a zero copy transmission.

Figure 2:
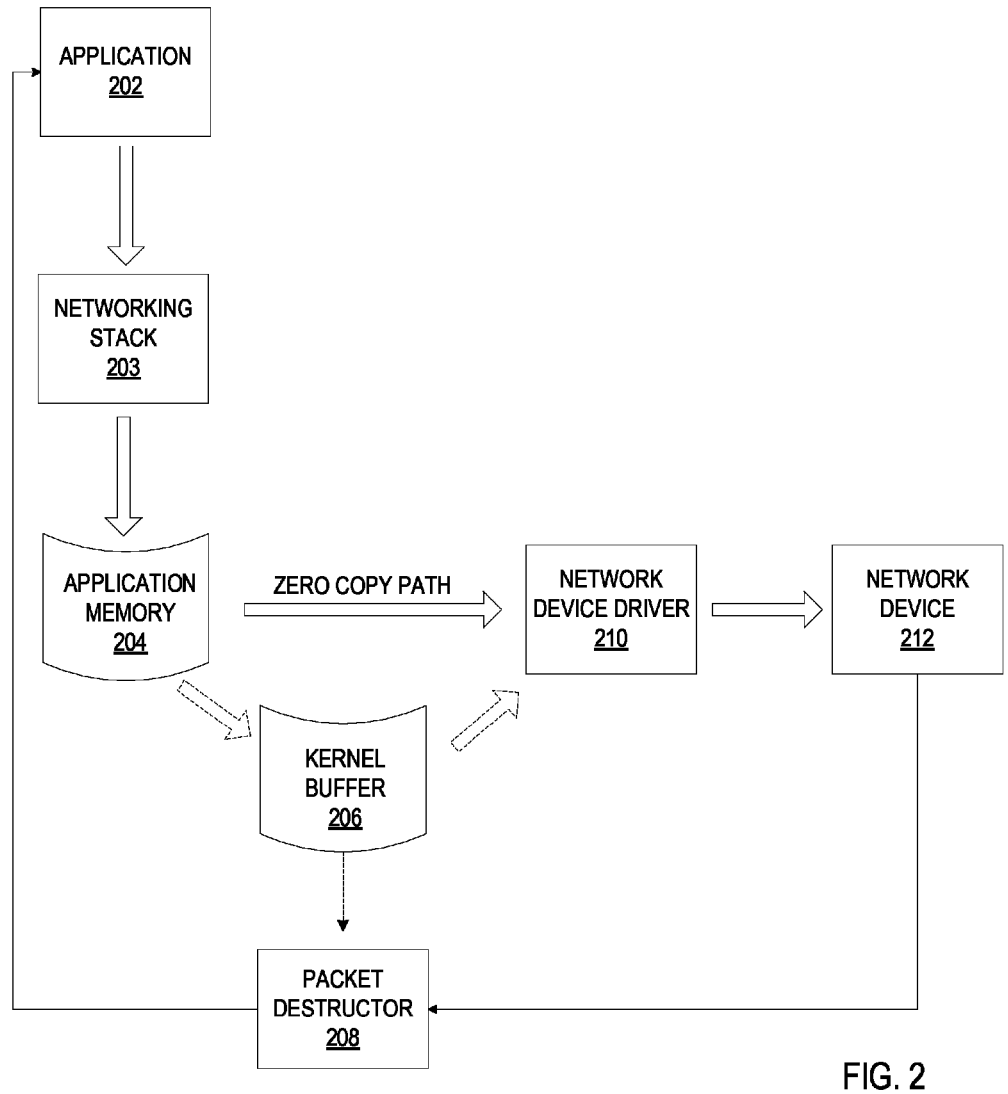
FIG. 2 is a block diagram illustrating a zero copy transmission with raw packets, in accordance with some embodiments.

FIG. 2 is a block diagram illustrating a zero copy transmission with raw packets, in accordance with some embodiments. An application 202 stores data that needs to be transmitted over a network in application memory 204. The application 202 decides which network device should be used for transmitting the data, and causes the data to go through networking stack processing. In one embodiment, the operating system includes a library that provides networking stack processing. The application 202 may send a request for networking stack processing to the operating system which provides the library to perform the networking stack functionality. In particular, the library includes functionality that splits data into packets and attaches headers to the packets. Each header may include all header data required for transmission by networking protocols or only partial data. In one embodiment, each header includes at least a transmission checksum. Because packetization of the data is initiated by the application 202, the resulting packets are referred to herein as "raw packets." In one embodiment, the networking stack processing also creates a gather list for the data packet. The gather list identifies memory locations storing data of the packet.

The application 202 issues a request to transmit a data packet over a network. The request may include a gather list of the data packet and may be issued via a system call that conventionally results in copying data from the application memory to the kernel buffer. Hence, the application 202 does not reuse the buffer 204 until it receives a signal that the copying has been completed.

When the operating system is notified about the data packet, it determines whether the data packet should be transmitted using a zero copy transmission. If the data packet should be transmitted using a zero copy transmission, the operating system pins down the application memory 204 and attaches to the packet a flag indicating that a zero copy transmission is being used, and a packet destructor function to be called by the network device 212 when the data packet has been queued for transmission. In addition, in one embodiment, the operating system also attaches to the packet a context pointer that identifies an entity (e.g., application 202) which needs to be notified when the application memory 204 is unpinned. In one embodiment, the operating system limits the amount of memory pinned as discussed above. In particular, before the operating system pins down the memory, it determines whether the amount of pinned memory exceeds a predefined threshold. If so, in one embodiment, the operating system does not accept the packet from the application, generating an error message in response to the application request pertaining to the data packet. In other embodiments, the operating system processes the packet until the amount of pinned memory becomes smaller, or decides that a zero copy transmission should not be used and copies the data packet from the application memory 204 to a kernel buffer 206.

Further, if the data packet has been handled using a zero copy transmission, the operating system notifies the network device driver 210 about the data packet residing in the application memory 204. In particular, in one embodiment, the operating system sends the gather list of the data packet to the network device driver 210. The network device driver 210 passes the gather list to the network device 212 which reads the data packet from the application memory 204 and queues the data packet for transmission.

The network device 212 also determines, from the flag attached to the data packet, that this data packet is handled using a zero copy transmission, and passes the packet destructor 208 (and optionally the context pointer) to the network device driver 210 when the data packet has been transmitted. The network device driver 210 signals to the operating system that the data packet has been transmitted, and calls the packet destructor 208 that signals to the application 202 that it can reuse the application memory 204.

If a zero copy transmission should not be used for transmitting the data packet, the operating system copies the data packet from the application memory 204 to a kernel buffer 206, calls the packet destructor 208, and notifies the network device driver 210 about the data packet residing in the kernel buffer 206. The packet destructor 208 signals to the application 202 that it can reuse the application memory 204.

Figure 3:
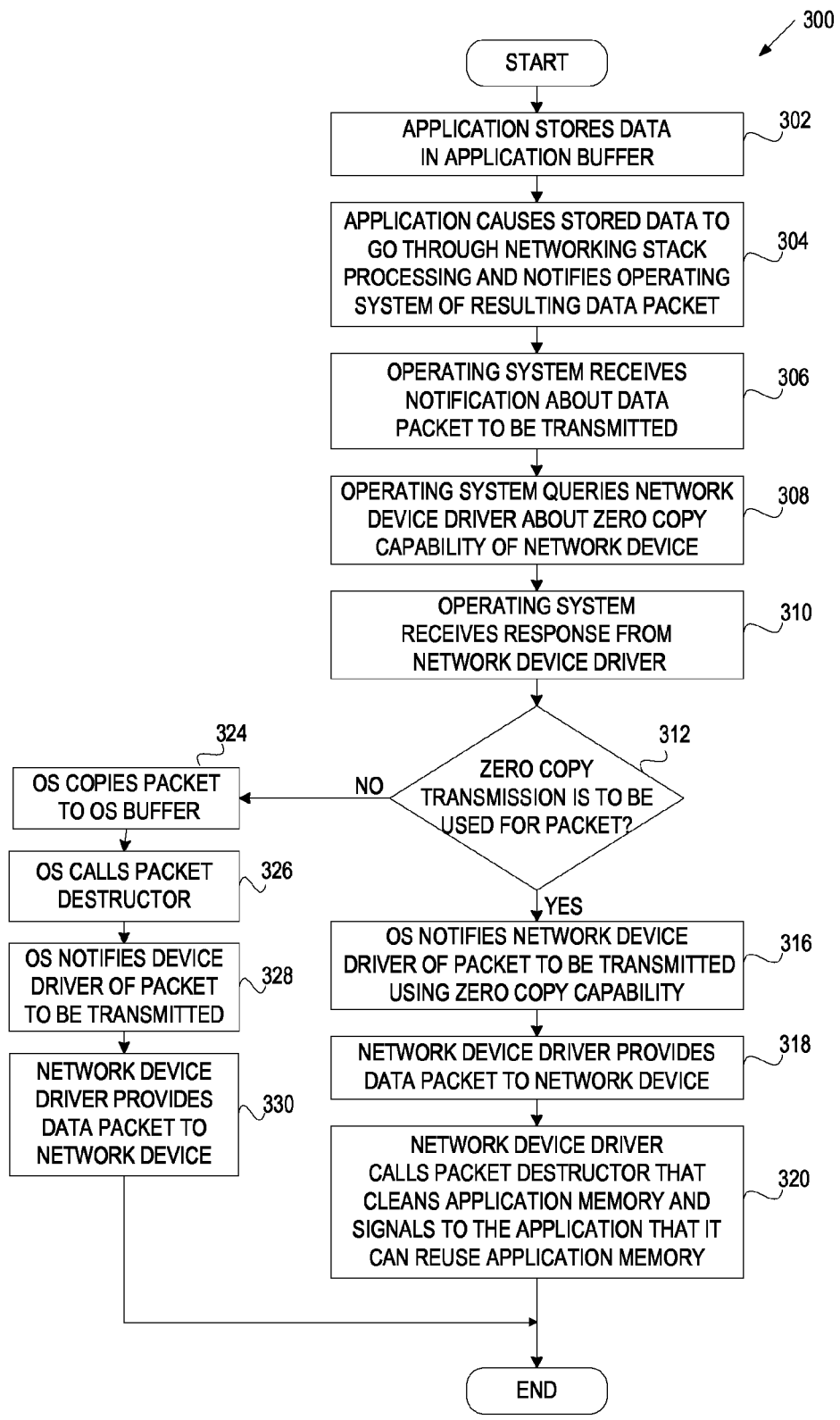
FIG. 3 is a flow diagram of one embodiment of a method for providing a zero copy transmission with raw packets.

FIG. 3 is a flow diagram of one embodiment of a method 300 for providing a zero copy transmission with raw packets. The method 300 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by a computing system (e.g., a computer hosting a zero copy transmission system 100 of FIG. 1).

Referring to FIG. 3, method 300 begins with an application storing, in an application buffer, data that needs to be transmitted over a network (block 302). At block 304, the application causes this data to go through networking stack processing. The networking stack processing may include packetizing the data and attaching at least a partial (e.g., at least a data checksum) header to each data packet. The networking stack processing may be invoked by, for example, the application calling a system library including networking stack functionality, issuing a system call to provide networking stack functionality, or performing a designated module or submodule of the application. The system library may be part of the operating system which invokes the system library to perform the networking stack processing upon receiving a designated command or a system call from the application. In one embodiment, the networking stack processing also involves creating a gather list specifying memory locations of data of the packet. The application then notifies the operating system about the data packet to be transmitted over a network. In one embodiment, the notification is done as a result of a system call issued by the application to request a kernel buffer for the data packet.

At block 306, the operating system receives the notification about the data packet to be transmitted over a network. At block 308, the operating system queries a network device driver on whether the network device has a zero copy capability. The network device is considered to provide a zero copy capability if it can satisfy a set of conditions when instructed to perform a zero copy transmission. In one embodiment, the set of conditions includes a requirement to call a packet destructor within a small (predefined) time period after a data packet has been passed to the network device for transmission, and a requirement not to access data from the packet after the packet destructor has been called. In one embodiment, the set of conditions also includes a requirement for the network device to support a gather list including references to different memory locations for data of the packet.

At block 310, the operating system receives a query response from the network device driver. Based on the query response, the operating system determines whether a zero copy transmission should be used for the data packet (block 312). In particular, if the network device does not provide a zero copy capability, the operating system decides that a zero copy transmission should not be used for the data packet. If the network device provides a zero copy capability, the operating system may either decide to use a zero copy transmission for the data packet, or it may perform additional evaluation with respect to the data packet to determine whether a zero copy transmission is justified for the data packet. The additional evaluation may be based on characteristics of the data packet (e.g., the size of the packet, location of data fragments of the packet, content of the packet header, etc.) or other factors (e.g., whether portions of the packet require additional processing such as filtering, etc.). In an alternative embodiment, additional evaluation is performed by the network device driver.

If a zero copy transmission should not be used, the operating system allocates a kernel buffer for the data packet, and copies the data packet from the application memory to the kernel buffer (block 324). At block 326, the operating system calls a packet destructor that signals to the application that it can reuse the application memory. At block 328, the operating system notifies the network device driver about the packet in the kernel buffer. At block 330, the network device driver provides the data packet to the network device.

If a zero copy transmission should be used for the packet, the operating system does not copy the packet to the kernel buffer, but rather notifies the network device driver about the packet in the application memory (e.g., by sending a gather list of the packet to the network device driver) (block 316). In one embodiment, the operating system attaches to the packet an indicator of a zero copy transmission, a packet destructor function, and optionally a context pointer. At block 318, the network device driver passes the data packet to the network device which queues the data packet for transmission. At block 320, the network device driver calls the packet destructor, which signals to the application that it can reuse the application memory.

As discussed above, after determining that the network device provides a zero copy capability, the operating system can perform additional analysis to determine whether a zero copy transmission is justified for the data packet. FIGS. 4 through 7 are flow diagrams of various embodiments of a method for performing additional analysis in relation to a zero copy transmission. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method is performed by an operating system (e.g., the operating system 104 of FIG. 1).

Figure 4:
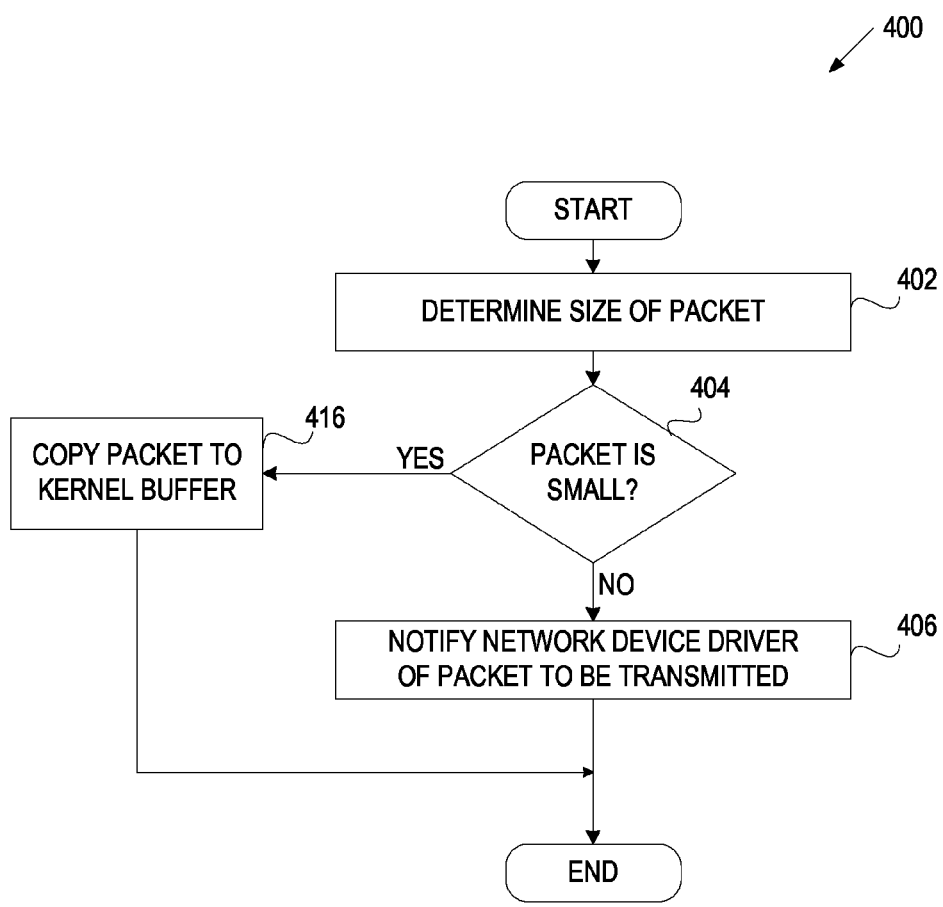
FIG. 4 is a flow diagram of one embodiment of a method for selectively providing a zero copy transmission based on the size of data packets.

FIG. 4 is a flow diagram of one embodiment of a method 400 for selectively providing a zero copy transmission based on the size of data packets. Method 400 starts after the operating system receives a query response from the network device driver, indicating that the network device has a zero copy capability. Upon receiving this response, the operating system determines the size of the packet (block 402). If the size of the packet is too small (below a predefined threshold) (block 404), the operating system decides that the zero copy transmission is not justified, copies the packet to the kernel buffer (block 416), and calls the packet destructor. The operating system may then wait for other small data packets of the application, and notify the network device driver about the accumulated small packets stored in the kernel buffer.

If the current data packet is medium or large (i.e., its size exceeds a predefined threshold), the operating system decides that a zero copy transmission is justified and notifies the network device driver of the packet in the application memory (block 406). As discussed above, in one embodiment, the operating system attaches to the packet an indicator of a zero copy transmission, a packet destructor function, and optionally a context pointer. The network device driver passes the data packet to the network device for transmission and calls the packet destructor.

Figure 5:
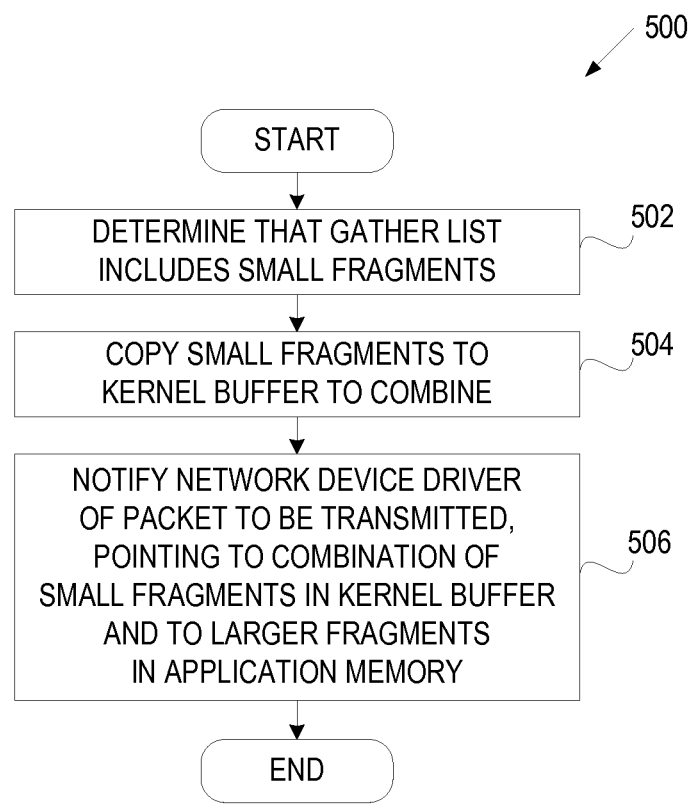
FIG. 5 is a flow diagram of one embodiment of a method for selectively providing zero copy transmission based on a gather list of a data packet.

FIG. 5 is a flow diagram of one embodiment of a method for selectively providing a zero copy transmission based on a gather list of a data packet. Method 500 starts after the operating system receives a query response from the network device driver, indicating that the network device has a zero copy capability. Upon receiving this response, the operating system determines that the gather list of the packet refers to a significant number of small data fragments (block 502). Based on this determination, the operating system decides that a zero copy transmission is justified only for larger fragments of the data packet. In particular, the operating system copies the small fragments to the kernel buffer (block 504), and notifies the network device driver about the data packet, providing references to larger (bigger than a predefined threshold) packets residing in the application memory and a reference to a collection of small fragments residing in the kernel buffer (block 506). In addition, the operating system attaches to the packet an indicator of a zero copy transmission, a packet destructor function, and optionally a context pointer. The network device driver passes the data packet to the network device to be queued for transmission and calls the packet destructor.

Figure 6:
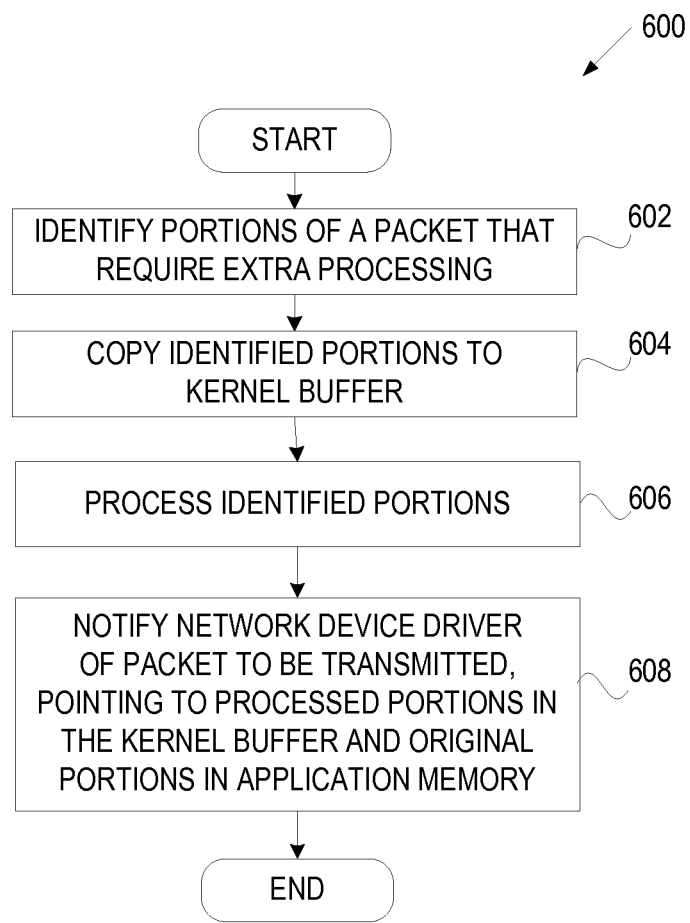
FIG. 6 is a flow diagram of one embodiment of a method for selectively providing a zero copy transmission based on need for extra processing of data within a data packet.

FIG. 6 is a flow diagram of one embodiment of a method 600 for selectively providing a zero copy transmission based on need for extra processing of data within a data packet. Method 600 starts after the operating system receives a query response from the network device driver, indicating that the network device has a zero copy capability. Upon receiving this response, the operating system determines that certain portions of a data packet require additional processing (e.g., filtering for data security) (block 602). Based on this determination, the operating system decides that a zero copy transmission is justified only for packet data that does not require additional processing. In particular, the operating system copies the portions of the packet that require additional processing to a kernel buffer (block 604), and causes the copied portions of the packet to be processed as required (block 606). Then, the operating system notifies the network device driver about the data packet, providing a reference to the processed data residing in the kernel buffer and references to the other packet data residing in the application memory (block 608). In addition, the operating system attaches to the packet an indicator of a zero copy transmission, a packet destructor function, and optionally a context pointer. The network device driver passes the data packet to the network device to be queued for transmission and calls the packet destructor.

Figure 7:
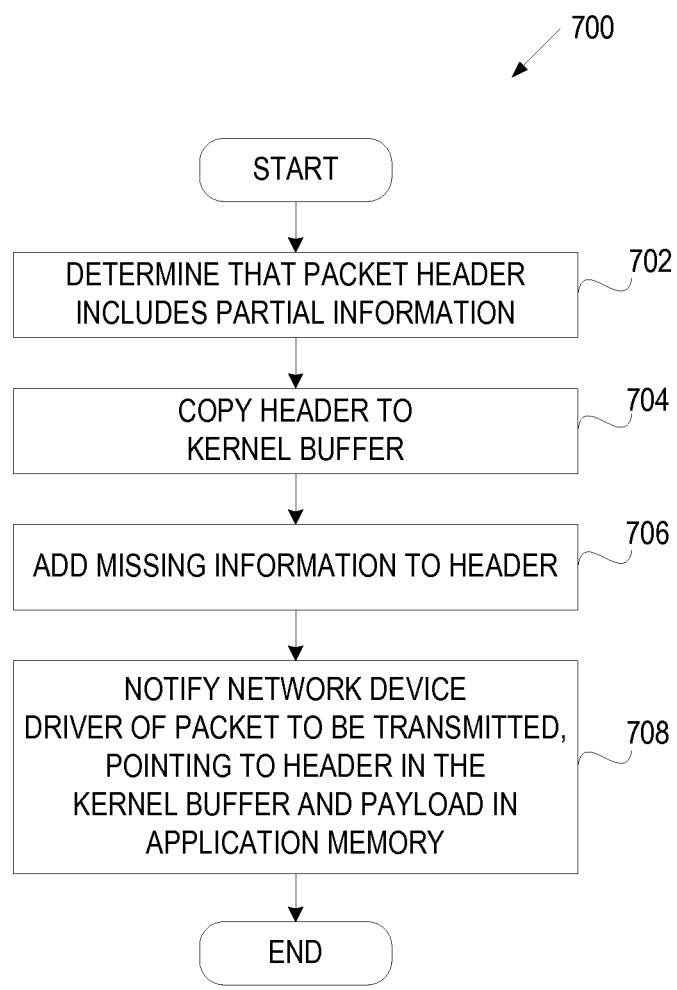
FIG. 7 is a flow diagram of one embodiment of a method for selectively providing a zero copy transmission based on an incomplete header of a data packet.

FIG. 7 is a flow diagram of one embodiment of a method 700 for selectively providing a zero copy transmission based on an incomplete header of a data packet. Method 700 starts after the operating system receives a query response from the network device driver, indicating that the network device has a zero copy capability. Upon receiving this response, the operating system determines that the header of the data packet is incomplete (e.g., includes only a transmission checksum) (block 702). Based on this determination, the operating system decides that a zero copy transmission is justified for the payload of the packet but not the header of the packet. The operating system then copies the header of the packet to a kernel buffer (block 704), and adds missing information to the header of the packet (block 606). Then, the operating system notifies the network device driver about the data packet, providing a reference to the header in the kernel buffer and references to the payload data residing in the application memory (block 506). In addition, the operating system attaches to the packet an indicator of a zero copy transmission, a packet destructor function, and optionally a context pointer. The network device driver passes the data packet to the network device for transmission and calls the packet destructor.

Figure 8:
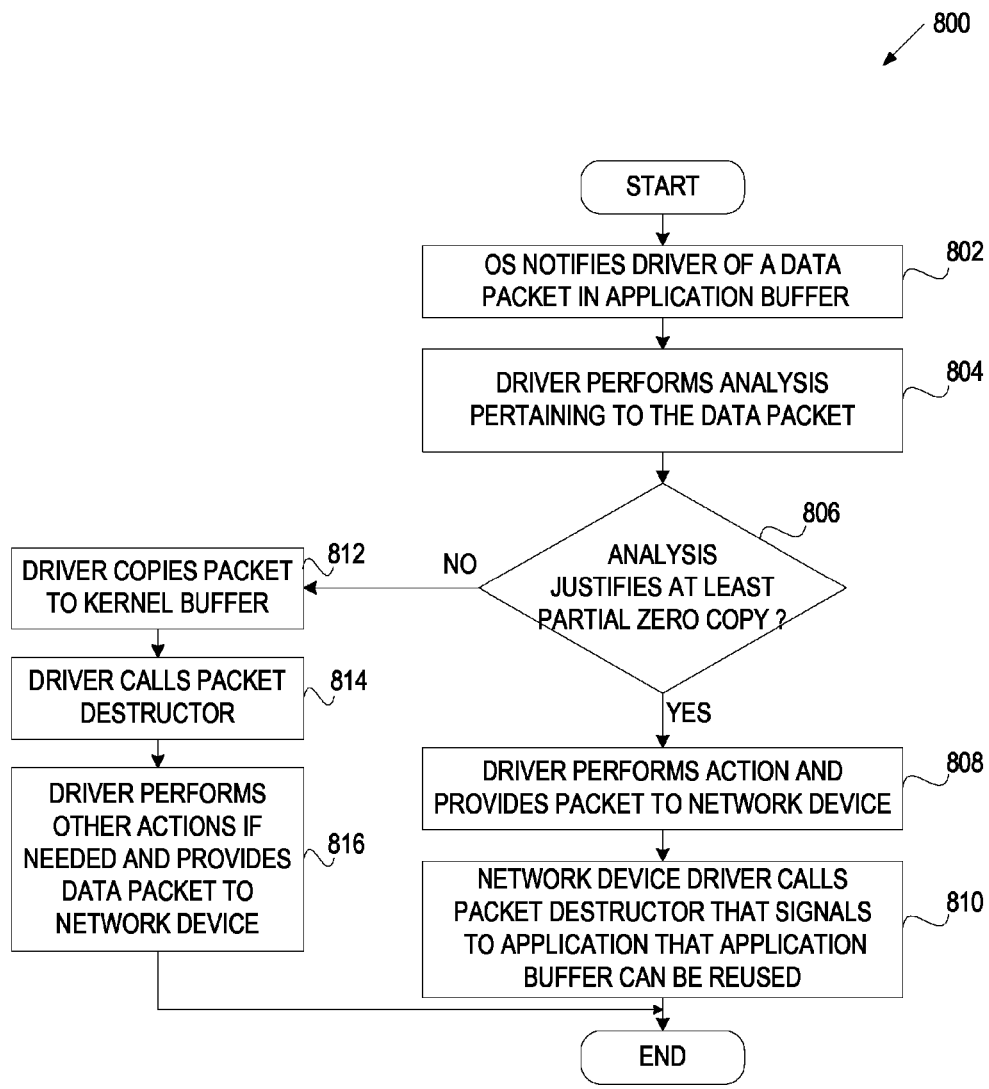
FIG. 8 is a flow diagram of one embodiment of a method for selectively providing a zero copy transmission by a network device driver.

FIG. 8 is a flow diagram of one embodiment of a method 800 for selectively providing a zero copy transmission by a network device driver. The method 800 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method is performed by a network device driver (e.g., network device driver 114 of FIG. 1).

Referring to FIG. 8, method 800 begins when the operating system notifies the network device driver about a data packet residing in the application memory (block 802). At block 804, the network device driver performs analysis similar to any of those performed by the operating system that are discussed in more detail above in conjunction with FIGS. 4 through 7. For example, the network device driver may evaluate the size of the data packet, the gather list of the data packet, whether additional processing (e.g., filtering) is required for portions of the data packet, whether the header of the data packet includes incomplete information, etc.

At block 806, the network device driver decides whether the analysis justifies at least partial zero copy transmission. If so, the network device driver performs required actions (e.g., partial copying, filtering, addition of header data, etc.) on the packet and passes the packet to the network device (block 808). The network device driver then calls the packet destructor, which signals to the application that the application buffer can be reused.

If the network device driver decides that the analysis does not justify any zero copy transmission, the network device driver copies the packet to the kernel buffer (block 812) and calls the packet destructor which signals to the application that the application buffer can be reused (block 814). The network device then performs other actions (e.g., data filtering) if needed and provides the data packet to the network device (block 816).

Figure 9:
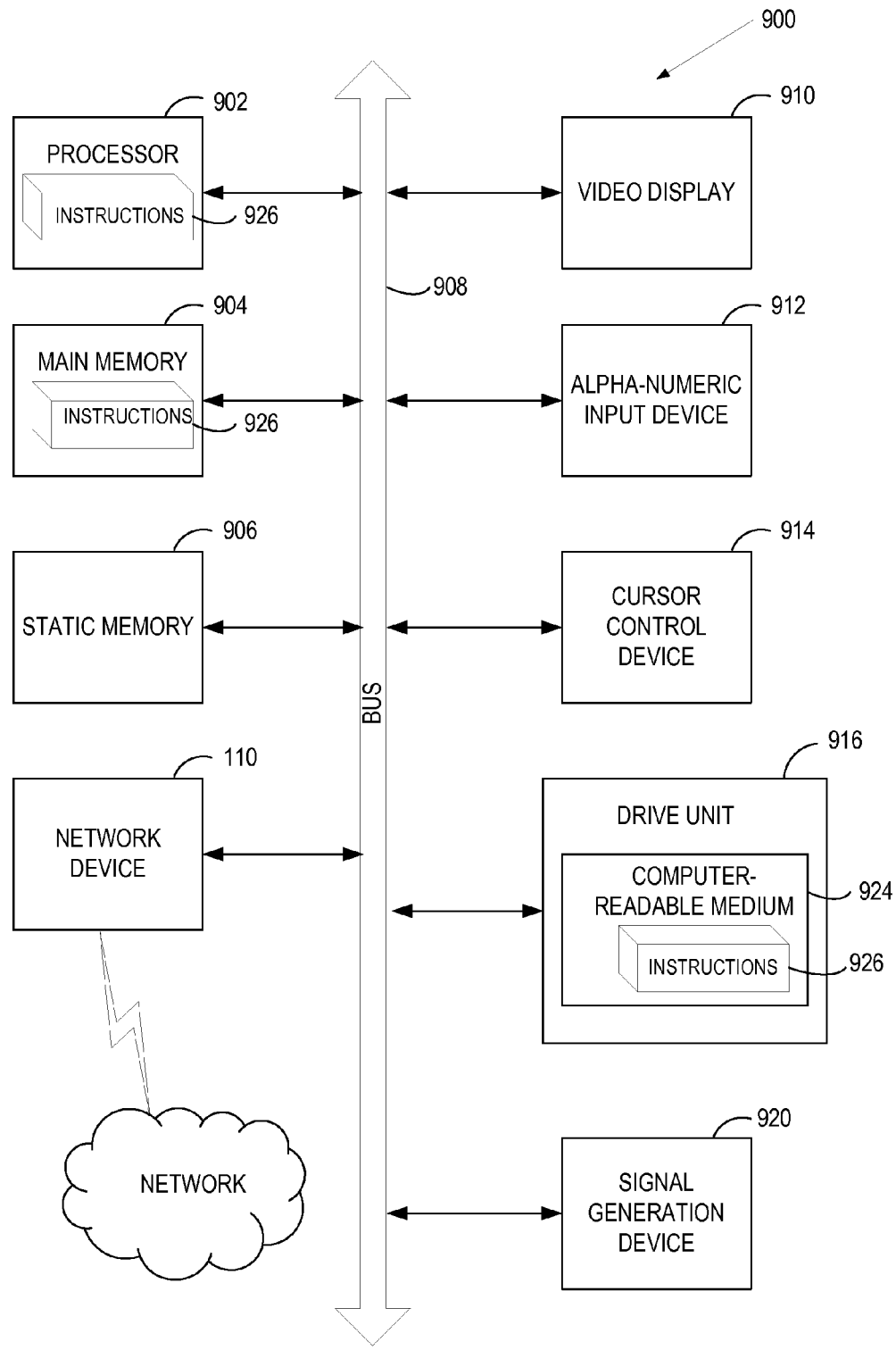
FIG. 9 is a block diagram of one embodiment of a computing system providing a zero copy transmission with raw packets.

FIG. 9 is a block diagram of one embodiment of a computing system providing a zero copy transmission with raw packets. Within the computing system 900 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computing system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory 916 (e.g., a data storage device in the form of a drive unit, which may include fixed or removable computer-readable storage medium), which communicate with each other via a bus 908.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. Processing device 902 is configured to execute instructions 926 (e.g., zero copy transmission system 100 of FIG. 1) for performing the operations and steps discussed herein.

The computer system 900 may further include a network device 110 (e.g., NIC, Ethernet network card, etc.). The computer system 900 also may include a video display unit 910 (e.g., a liquid crystal display (LCD) or a cathode ray tube (CRT)) connected to the computer system through a graphics port and graphics chipset, an alphanumeric input device 912 (e.g., a keyboard), a cursor control device 914 (e.g., a mouse), and a signal generation device 920 (e.g., a speaker).

The secondary memory 916 may include a machine-readable storage medium (or more specifically a computer-readable storage medium) 924 on which is stored one or more sets of instructions (e.g., zero copy transmission system 100 of FIG. 1) embodying any one or more of the methodologies or functions described herein. The instructions 926 (e.g., zero copy transmission system 100 of FIG. 1) may also reside, completely or at least partially, within the main memory 904 and/or within the processing device 902 during execution thereof by the computer system 900, the main memory 904 and the processing device 902 also constituting machine-readable storage media. The instructions 926 (e.g., zero copy transmission system 100 of FIG. 1) may further be transmitted or received over a network 918 via the network device 110.

The computer-readable storage medium 924 may also be used to store the instructions 926 (e.g., zero copy transmission system 100 of FIG. 1) persistently. While the computer-readable storage medium 926 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The components and other features described herein (for example in relation to FIG. 1) can be implemented as discrete hardware components or integrated in the functionality of hardware components such as ASICS, FPGAs, DSPs or similar devices. In addition, these components can be implemented as firmware or functional circuitry within hardware devices. Further, these components can be implemented in any combination of hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "querying," "determining," "notifying," "copying," "generating," "transmitting" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for providing a zero copy transmission with raw packets has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method, implemented by a computing system, comprising:
   receiving, by an operating system of the computing system, an application request pertaining to a data packet to be transmitted over a network using a network device, the data packet having gone through networking stack processing invoked by the application, the data packet residing in memory of the application and having at least a partial header created during the networking stack processing;
   querying, by the operating system, a driver of the network device of the computing system on whether the network device has a zero copy capability;
   upon receiving, from the network device driver, a query response specifying whether the network device driver has the zero copy capability, determining, by the operating system, whether a zero copy transmission is to be used for the data packet based on the query response of the network device driver;
   if the zero copy transmission is to be used, notifying the driver of the network device about the data packet in the application memory, the data packet to be transmitted over the network using the zero copy transmission that avoids copying the data packet to a kernel buffer; and
   if the zero copy transmission is not to be used, copying the data packet from the application memory to the kernel buffer, and notifying the driver of the network device about the data packet in the kernel buffer.

2. The method of claim 1 wherein the network device has the zero copy capability if the network device, when instructed to perform the zero copy transmission, is configured to cause a packet destructor to be called within a predefined time period after being notified of the data packet to be transmitted, and to prevent access to data in the data packet after the packet destructor is called.

3. The method of claim 2 wherein the network device has the zero copy capability if the network device is further configured to access data in arbitrary memory locations according to a gather list of the data packet.

4. The method of claim 1 further comprising:
   upon determining that the zero copy transmission is to be used, attaching to the data packet additional information including at least one of a zero copy transmission indicator, a destructor function to be used by the network device for the data packet, or a context pointer.

5. The method of claim 1 further comprising:
   upon determining that the zero copy transmission is to be used, locking the application memory, and causing the application memory to be unlocked when a packet destructor is called, the packet destructor being called by the network device after receiving the data packet for transmission.

6. The method of claim 5 further comprising:
   determining that the size of the application memory to be locked exceeds a threshold; and
   rejecting the request of the application to transmit the data packet.

7. The method of claim 1 wherein determining whether the zero copy transmission is to be used comprises:
   determining, based on the query response of the network device driver, that the network device has the zero copy capability;
   determining whether the size of the data packet exceeds a threshold;
   if the size of the data packet does not exceed the threshold, determining that the zero copy transmission is not to be used for the data packet; and
   if the size of the data packet exceeds the threshold, determining that the zero copy transmission is to be used for the data packet.

8. The method of claim 1 wherein determining whether the zero copy transmission is to be used comprises:
   determining, based on the query response of the network device driver, that the network device has the zero copy capability;
   determining that a number of small-size fragments in a gather list of the data packet exceeds a threshold;
   copying the small size fragments to the kernel buffer; and
   determining that the zero copy transmission is to be used for the remaining fragments in the gather list of the data packet.

9. The method of claim 1 wherein determining whether the zero copy transmission is to be used comprises:
   determining, based on the query response of the network device driver, that the network device has the zero copy capability;
   determining that portions of the data packet require extra processing;
   copying the portions that require extra processing to the kernel buffer; and
   determining that the zero copy transmission is to be used for the remaining portions of the data packet.

10. The method of claim 1 wherein determining whether the zero copy transmission is to be used comprises:

determining, based on the query response of the network device driver, that the network device has the zero copy capability;

determining that a header of the data packet includes incomplete information;

copying the header of the data packet to the kernel buffer; and determining that the zero copy transmission is to be used for a payload of the data packet.

11. The method of claim 1 wherein the driver of the network device is configured to receive a notification of the operating system about the data packet to be transmitted using the zero copy transmission, and to determine, based on characteristics of the data packet, whether to use the zero copy transmission for the data packet.

12. The method of claim 1 further comprising:

invoking a system library to perform the networking stack processing upon receiving a request of the application.

13. The method of claim 1 wherein:

a transmission checksum is calculated during the networking stack processing; and the network device does not support transmission checksum calculations.

14. A non-transitory computer readable storage medium including instructions that, when executed by a computer system, cause the computer system to perform a set of operations comprising:

receiving, by an operating system of the computer system, an application request pertaining to a data packet to be transmitted over a network using a network device, the data packet having gone through networking stack processing invoked by the application, the data packet residing in memory of the application and having at least a partial header created during the networking stack processing;

querying, by the operating system, a driver of the network device of the computing system on whether the network device has a zero copy capability;

upon receiving, from the network device driver, a query response specifying whether the network device driver has the zero copy capability, determining, by the operating system, whether a zero copy transmission is to be used for the data packet based on the query response of the network device driver;

if the zero copy transmission is to be used, notifying the driver of the network device about the data packet in the application memory, the data packet to be transmitted over the network using the zero copy transmission that avoids copying the data packet to a kernel buffer; and if the zero copy transmission is not to be used, copying the data packet from the application memory to the kernel buffer, and notifying the driver of the network device about the data packet in the kernel buffer.

15. The computer readable storage medium of claim 14, wherein the network device has the zero copy capability if the network device, when instructed to perform the zero copy transmission, is configured to cause a packet destructor to be called within a predefined time period after being notified of the data packet to be transmitted, and to prevent access to data in the data packet after the packet destructor is called.

16. The computer readable storage medium of claim 15 wherein the network device has the zero copy capability if the network device is further configured to access data in arbitrary memory locations according to a gather list of the data packet.

17. The computer readable storage medium of claim 14 further comprising: upon determining that the zero copy transmission is to be used, attaching to the data packet additional information including at least one of a zero copy transmission indicator, a destructor function to be used by the network device for the data packet, or a context pointer.

18. The computer readable storage medium of claim 14 wherein the driver of the network device is configured to receive a notification of the operating system about the data packet to be transmitted using the zero copy transmission, and to determine, based on characteristics of the data packet, whether to use the zero copy transmission for the data packet.

19. The computer readable storage medium of claim 14 wherein:

a transmission checksum is calculated during the networking stack processing; and the network device does not support transmission checksum calculations.

20. A computer system comprising:

a memory;

a network device coupled to the memory;

at least one processor coupled to the memory; and an operating system executed by the at least one processor to:

receive an application request pertaining to a data packet to be transmitted over a network using the network device, the data packet having gone through networking stack processing invoked by the application, the data packet residing in memory of the application and having at least a partial header created during the networking stack processing;

query a driver of the network device of the computing system on whether the network device has a zero copy capability;

upon receiving, from the network device driver, a query response specifying whether the network device driver has the zero copy capability, determine whether a zero copy transmission is to be used for the data packet based on the query response of the network device driver;

if the zero copy transmission is to be used, notify the driver of the network device about the data packet in the application memory, the data packet to be transmitted over the network using a zero copy transmission that avoids copying the data packet to a kernel buffer; and if the zero copy transmission is not to be used, copy the data packet from the application memory to the kernel buffer, and notifying the driver of the network device about the data packet in the kernel buffer.

21. The system of claim 20, wherein the network device has the zero copy capability if the network device, when instructed to perform the zero copy transmission, is configured to cause a packet destructor to be called within a predefined time period after being notified of the data packet to be transmitted, and to prevent access to data in the data packet after the packet destructor is called.

22. The system of claim 21 wherein the network device has the zero copy capability if the network device is further configured to access data in arbitrary memory locations according to a gather list of the data packet.

23. The system of claim 20 further comprising:

upon determining that the zero copy transmission is to be used, attaching to the data packet additional information including at least one of a zero copy transmission indicator, a destructor function to be used by the network device for the data packet, or a context pointer.

24. The system of claim 20 wherein the driver of the network device is configured to receive a notification of the operating system about the data packet to be transmitted using the zero copy transmission, and to determine, based on characteristics of the data packet, whether to use the zero copy transmission for the data packet.

25. The system of claim 20 wherein:
a transmission checksum is calculated during the networking stack processing; and
the network device does not support transmission checksum calculations.

* * * * *